P. CAUHAPE.
Pill-Machines.

No. 152,461. Patented June 30, 1874.

WITNESSES:
A. Bennernendorf
O. Sigwerk

INVENTOR:
P. Cauhape
BY
ATTORNEYS.

UNITED STATES PATENT OFFICE.

PIERRE CAUHAPE, OF NEW YORK, N. Y.

IMPROVEMENT IN PILL-MACHINES.

Specification forming part of Letters Patent No. 152,461, dated June 30, 1874; application filed June 6, 1874.

*To all whom it may concern:*

Be it known that I, PIERRE CAUHAPE, of the city, county, and State of New York, have invented a new and Improved Pill-Machine, of which the following is a specification:

My invention consists of a couple of sets of pointed hooks in a jointed stock, which opens and closes the hooks for griping and releasing pills, in combination with a table and a holding-bar, for holding the pills so as to be taken by the hooks for dipping them in the gelatine coating-bath; also, a socket-clamp for taking the pills from the hooks after the first dipping; and also a spring-clamp for taking the pills from the socket-clamp and dipping them a second time in the coating-bath, all as hereinafter described.

Figure 1:
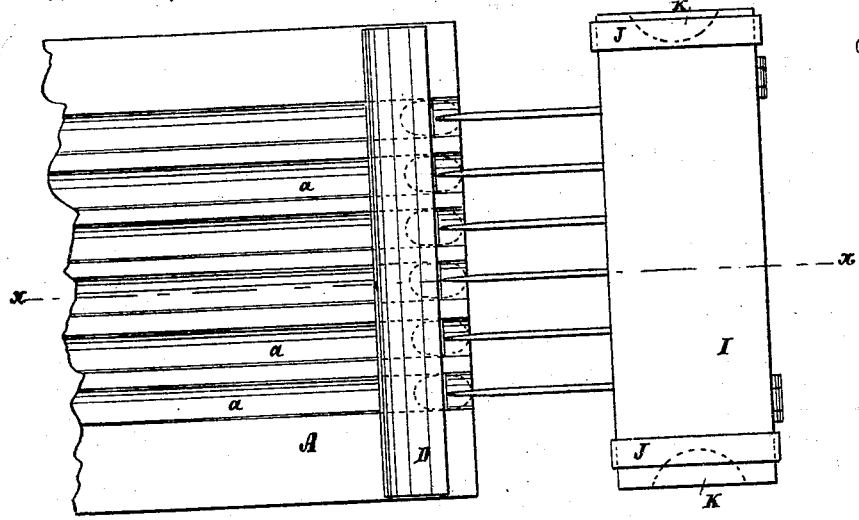
Figure 3:
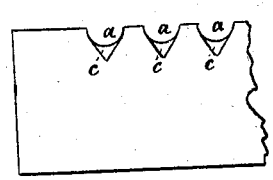
Figure 2:
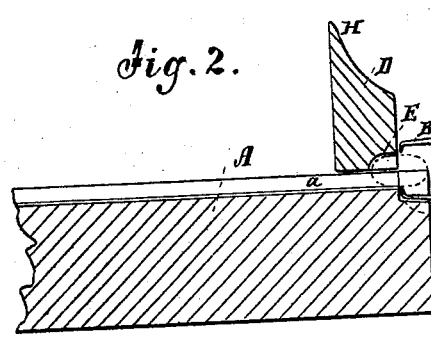
Figure 5:
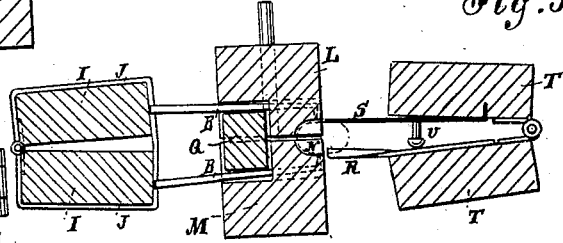
Figure 4:
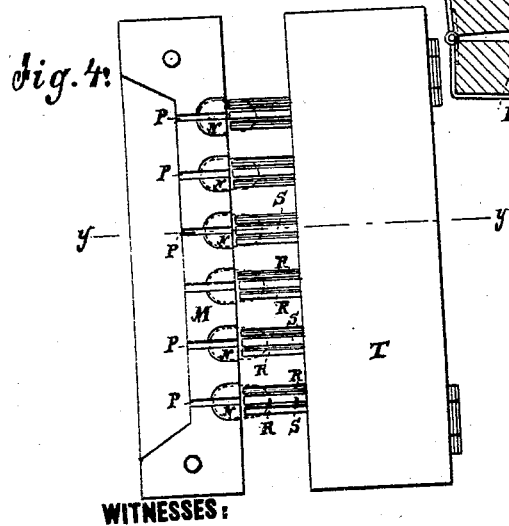
Figure 6:
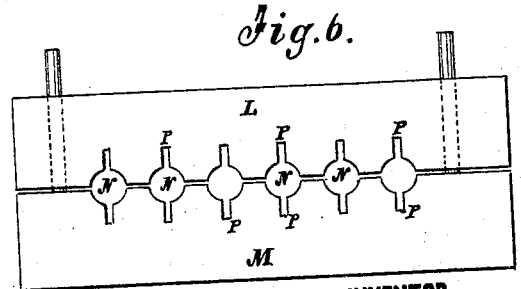

Figure 1 is a plan of the hooks and their jointed stock, also the pill-holders. Fig. 2 is a sectional elevation of Fig. 1, taken on the line $x$ $x$. Fig. 3 is a front elevation of the plate or table represented in Fig. 1, on which the pills are held to be taken by the hooks. Fig. 4 is a front elevation of the socket-clamp for taking the pills from the hooks, also for presenting them to the spring dipping-holder. Fig. 5 is a plan of the socket-clamp and spring dipping-holder. Fig. 6 is a section of Fig. 5 on the line $y$ $y$.

Similar letters of reference indicate corresponding parts.

A is a wide board or table, having its upper surface grooved, as at $a$, to hold the pills for the hooks B to take them, in the manner indicated in Figs. 1 and 2, for dipping them in the coating-bath. At one end of each groove is a recess, C, in the table, in which the lower hooks are placed, while the upper hooks are raised higher than the pills, to allow them to be pushed along between the hooks by a pushing-bar, D, which has recesses in its front lower corner, coinciding with the grooves, to receive the rear portions of the pills while pushing them along to the hooks, the object being to control them better than they could be by a plain pushing-bar. The upper edge H of this bar is made sharp to receive separately a row of pills from the recess in the grooves on the table, ready to be pushed along to the hooks. Each set of hooks is arranged in a long bar or head, I. The two heads are arranged side by side and hinged together at the back, so that the hooks may be closed on the pills to engage them by hooking into two opposite sides, to hold them for dipping in the bath, and be opened to release the pills after dipping. Rubber bands J, or other springs, will be employed to hold the hooks closed, and they will be forced open to receive the pills between them, as indicated in Fig. 2, by the operator pressing his fingers in the cavities K, indicated in the ends by dotted lines. These hooks engage the pills a little short of the center, so that they can dip them to the middle without the hooks entering the bath. After the first dip the pills are discharged from the hooks into the socket-clamp L M, to be taken by the spring-clamp for dipping the other half by raising the upper jaws of the clamp, placing the pills in the socket N of the lower one, the hooks being presented from the back or left hand, as represented in Fig. 5, and forcing the hooks apart out of the pills into the notches P, by shoving the bar Q along between the converging hooks toward the clamp, or by opening them as they are opened for engaging the pills in the first place, and then pulling the hooks back out of the notches. The pills, being thus left in the clamp, and projecting about half their breadth, are taken from the clamp M L by the spring-fingers R S of a clamp composed of said fingers and a couple of bars, T, hinged together, and the undipped portions dipped again in the bath to complete the coating. The spring-clamp has adjusting-screws V to regulate the pressure of the spring on the pills.

Thus the pills will be thoroughly coated and the holes made by the hooks in the first operation closed.

A special advantage of this apparatus over others is, that the pills may be dipped each time exactly to the center, so that the two coats will meet and join thereat without overlapping, and thus make the pills more uniform than they are made by other apparatus.

Having thus described my invention, I claim as new and desire to secure by Letters Patent—

1. The combination of the two sets of pointed hooks B, jointed heads or bars I, and springs J, substantially as specified.

2. The combination of the hook-clamp I B

J with the grooved and socketed table A and socketed pushing-bar D, substantially as specified.

3. The combination of the hook-clamp I B J and the socket-clamp M L, substantially as specified.

4. The combination of the spring-clamp R S T with the socket-clamp M L, substantially as specified.

5. The grooved and socketed table A and socketed pushing-bar D, combined substantially as specified.

6. The clamp L M, with sockets N and notches P, substantially as specified.

7. The spring-fingers R S, hinged bars T, and regulating-screw V, combined and arranged substantially as specified.

P. CAUHAPE.

Witnesses:
T. B. MOSHER,
ALEX. F. ROBERTS.